Figure 1:
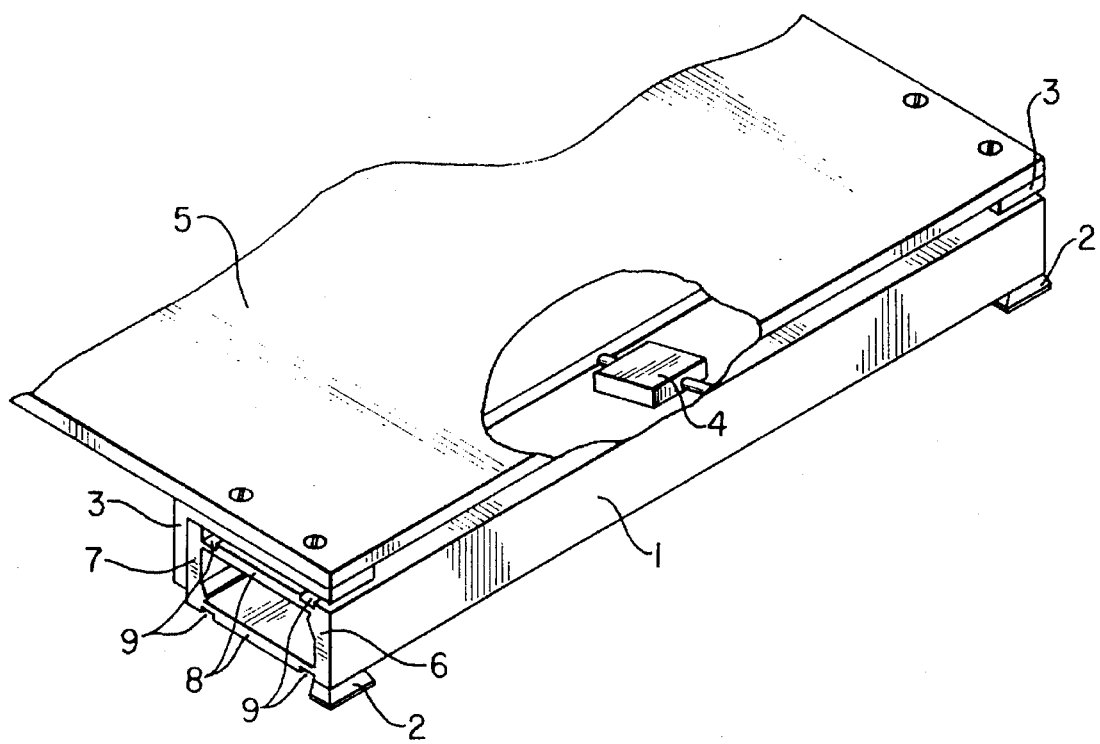

United States Patent [19]

Wirth

[11] Patent Number: 5,496,973

[45] Date of Patent: * Mar. 5, 1996

[54] TWO POINT LOAD CELL

[75] Inventor: Johannes Wirth, Zurich, Switzerland

[73] Assignee: Wirth Gallo Messtechnik AG, Zurich, Switzerland

[*] Notice: The portion of the term of this patent subsequent to Nov. 15, 2011, has been disclaimed.

[21] Appl. No.: 271,846

[22] Filed: Jul. 7, 1994

Related U.S. Application Data

[63] Continuation of Ser. No. 955,742, Dec. 7, 1992, Pat. No. 5,365,022.

[30] Foreign Application Priority Data

Jun. 24, 1991 [CH] Switzerland .......................... 01859/91

[51] Int. Cl.⁶ .................................................. G01G 3/08
[52] U.S. Cl. ..................................... 177/229; 73/862.627
[58] Field of Search ................. 177/229, 16; 73/862.627

[56] References Cited

U.S. PATENT DOCUMENTS

| | | | |
|---|---|---|---|
| 4,065,962 | 1/1978 | Shoberg | 73/862.627 |
| 4,103,545 | 8/1978 | Rykwalder et al. | 73/862.627 |
| 4,143,727 | 3/1979 | Jacobson | 177/229 X |
| 4,655,306 | 4/1987 | Saner | 177/229 |
| 4,657,097 | 4/1987 | Griffen | 177/229 X |
| 4,682,664 | 7/1987 | Kemp | 177/16 |
| 5,365,022 | 11/1994 | Wirth | 177/229 |

Primary Examiner—Peter S. Wong
Assistant Examiner—Randy W. Gibson
Attorney, Agent, or Firm—Jenkens & Gilchrist

[57] ABSTRACT

The rod-shaped load cell consists of a guide section (1), which is subdivided into a frame (6) and a load-bearing element (7), and two parallel, rigid plates (8) connecting the two cited elements. Plates (8) are connected to both frame (6) and load-bearing element (7) by band-shaped flexural joints (9) which extend across the overall length of guide section (1). The load cell rests via frame (6) upon two feet (2) located outermost on rod-shaped guide section (1). The platform (5) rests upon two mounting elements (3) also located outermost on guide section (1), with the mounting elements (3) acting on load-bearing element (7). A force sensor (4) is diagonally installed at half the length of guide section (1). When platform (5) is loaded, tensile force acts upon force sensor (4) (see FIG. 1).

11 Claims, 6 Drawing Sheets

TWO POINT LOAD CELL

This application is a continuation of application Ser. No. 07/955,742, filed Dec. 7, 1992, now U.S. Pat. No. 5,365,022.

The invention concerns a rod-shaped load cell with two load input points.

The measurement of linear or two-dimensional loads by means of modern electromechanical dynamometric devices involves special problems. If a single load cell is used for a platform type scale, which by its nature has only a single point of load or force input, then limitations arise with respect to the size of the platform, due to the existence of the so-called angular load error. This also applies in a similar manner with respect to linear measuring devices, such as overhead rail scales. Consequently, numerous dynamometric cells are used for large, high-capacity platforms and long overhead rail gauge lengths, usually three to four cells for platforms, and two cells for overhead rail gauge lengths. Since under current conditions the use of four dynamometric cells is not economical until platform sizes of approximately 2×2 meters or greater for large-capacity scales are involved (with the same applying for overhead rail scales), an area size becomes involved at which platform scales become either too imprecise or too expensive. In the case of smaller high-capacity scales, there is still an option of stiffening metrologically vital components, although this can basically only be achieved through taller design configurations.

The goal of the invention described herein is to create a load cell which favorably allows the simple and economic and construction of larger and lower platform scales and longer overhead rail gauge lengths.

The solution to the problem described is set forth in Patent claim 1. The concept of the invention is explained through numerous design variants shown in the attached drawings:

FIG. 1=An initial example of a load cell built into a platform scale.

Figure 2:
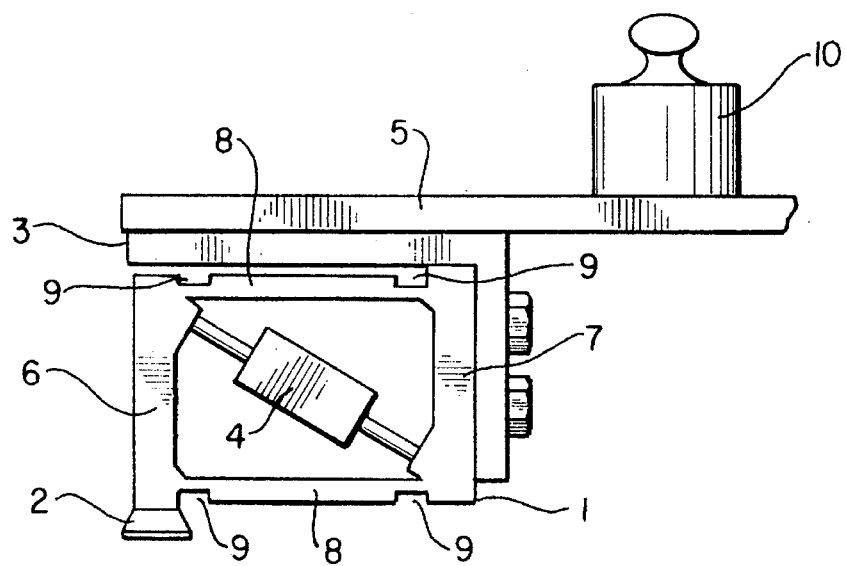

FIG. 2=A cross-section through the design variant shown in FIG. 1.

Figure 3A:
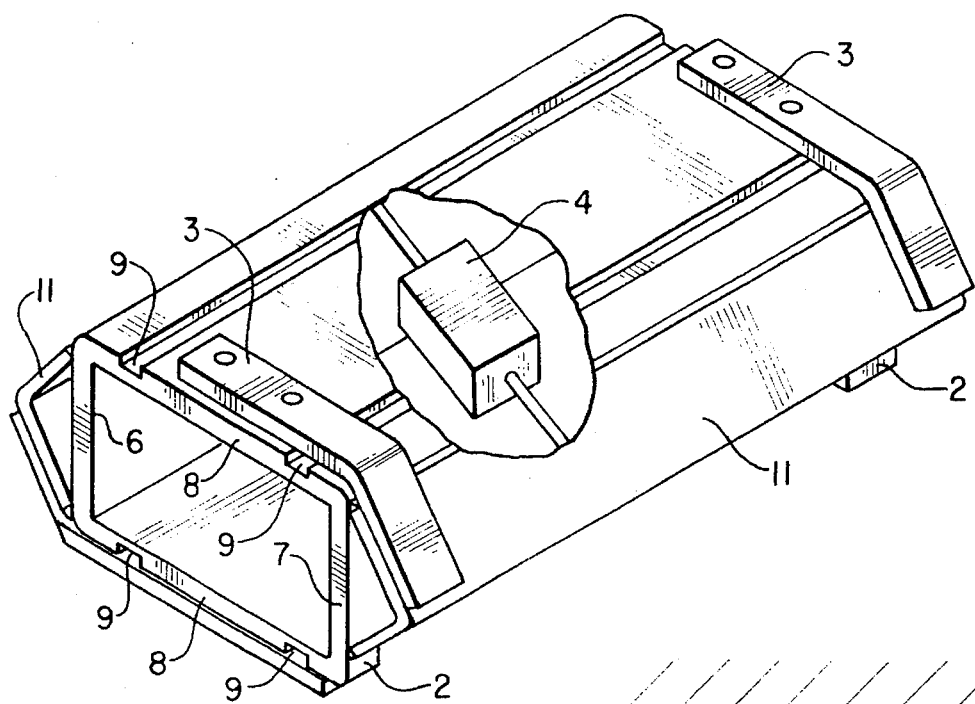

FIG. 3A=A second design variant of a load cell with a welded section.

Figure 3B:
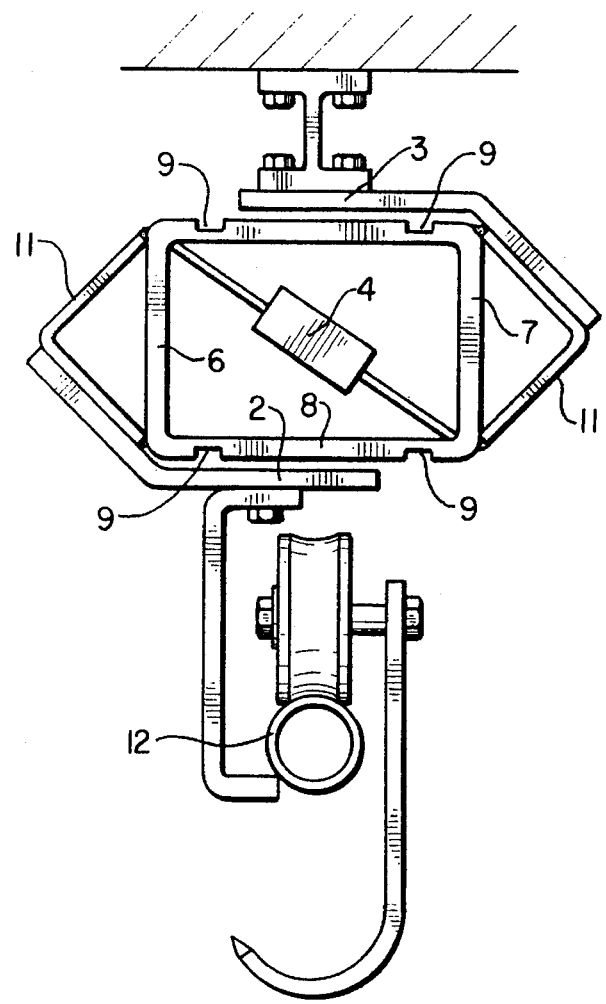

FIG. 3B=A perspective view of the design variant shown in FIG. 3A, used as a hanging scale.

Figure 4:
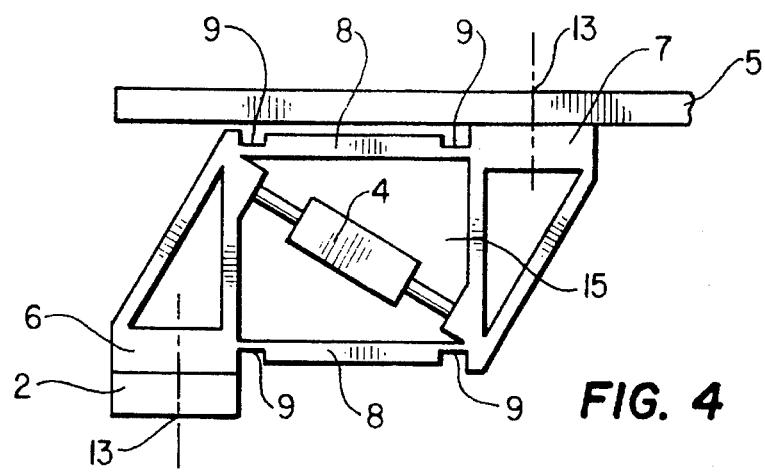

FIG. 4=A third design variant of a load cell with an extruded section.

Figure 5:
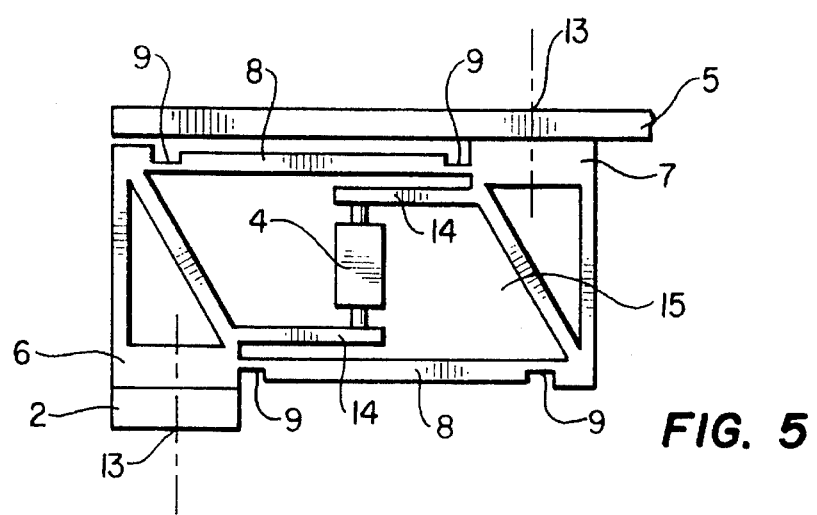

FIG. 5=A fourth design variant of a load cell with an extruded section.

Figure 6:
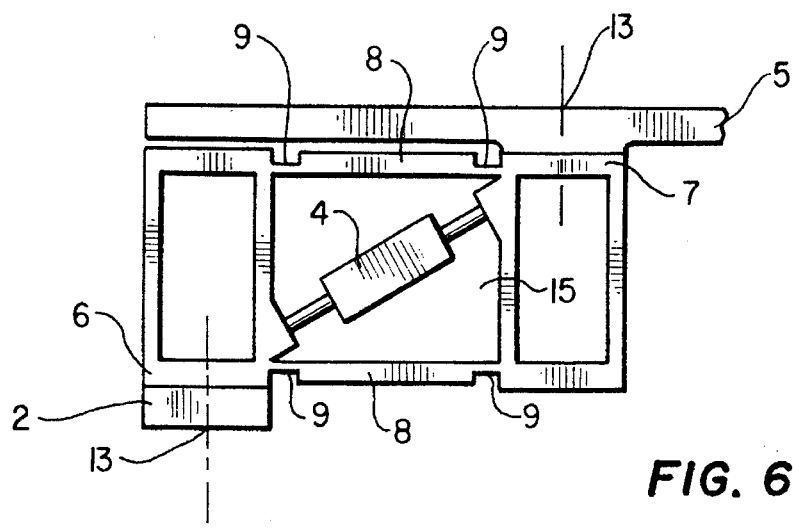

FIG. 6=A fifth design variant of a load cell with an extruded section.

Figure 7A:
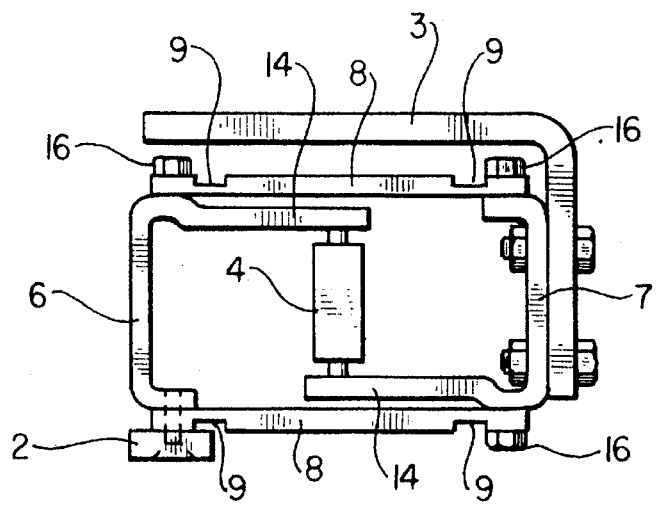

FIG. 7A, B=A sixth design variant of a load cell with a bolted section.

Figure 8:
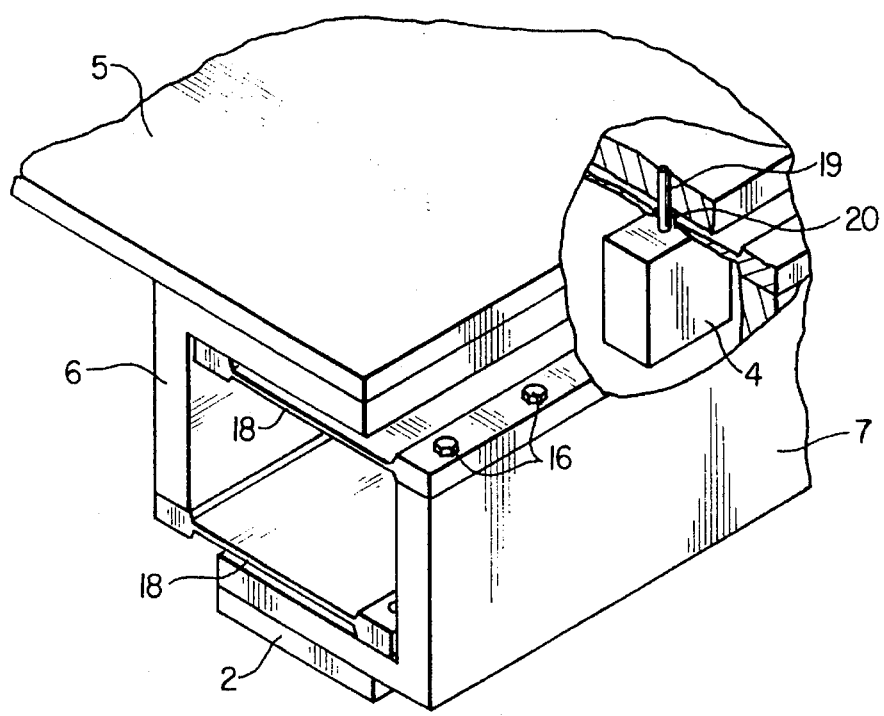

FIG. 8=A seventh design variant of a load cell with a bolted section.

Figure 9:
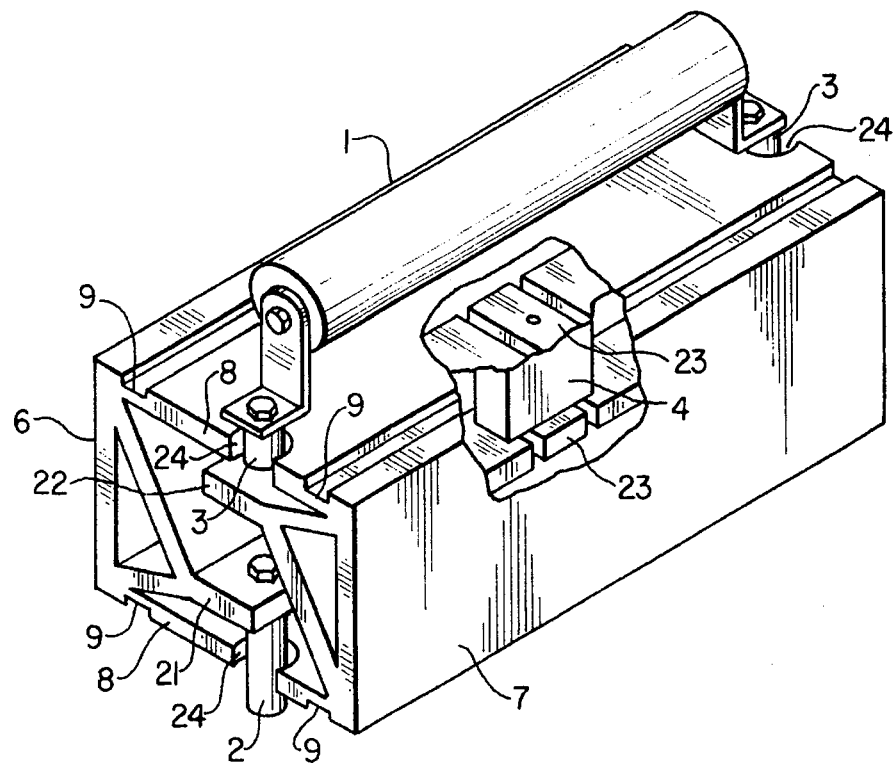

FIG. 9=An eight design variant of a load cell with an extruded section, installed in a conveyor belt scale.

Figure 10:
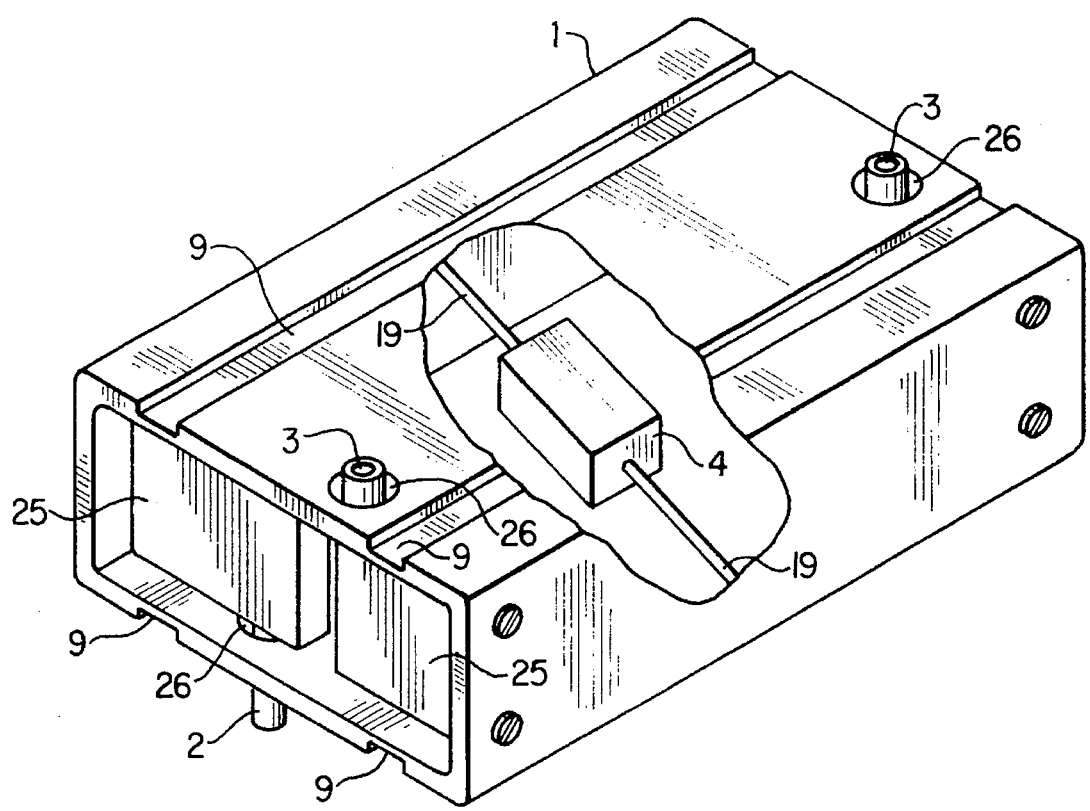

FIG. 10=A ninth design variant of a load cell with a pressed section.

FIG. 1 shows the perspective of a partially cutaway view of a portion of a platform scale containing the initial design variant of a load cell as described herein. FIG. 2 shows a cross-section of the same arrangement.

A longitudinal guide section 1, consisting of a rod-shaped frame 6, a rod-shaped load-bearing element 7, and two rod-shaped plates 8 with band-shaped flexural joints, extending across the overall length of guide section 1, rest, with frame 6, on two feet 2, which are attached to the outermost exterior of frame 6. Two elbowed mounting elements 3 are attached to load-bearing element 7 at the same longitudinal position as the feet, and support a platform 5 on one side of each of the mounting elements. There is an identical load cell on the other side of platform 5 (not shown), located in axial symmetry to the first load cell.

The longitudinal extension of guide section 1 is such as to amount to a multiple of its lateral dimension.

A force sensor 4 is located in a diagonal position at half the length of guide section 1. If platform 5 is loaded by the weight of a mass 10, then the force flow is distributed in accordance with the elasticity of flexural joints 9 and that of force sensor 4, modified by the angular position of force sensor 4. Thus, what is involved is a reduction in the elasticity of flexural joints 9 and the inherent or installed elasticity of force sensor 4. The type of force sensor 4 involved can be all currently known types, such as strain gauges, and piezoelectric, optoelastic, and string sensors.

Due to the high rigidity of plate 8 of frame 6 and of load-bearing element 7, compared to that of flexural joints 9, it is possible to reduce the angular load error of a platform scale of the type shown in FIGS. 1 and 2. The weight of a mass 10 is, as is known, determined through the summation of the data provided by the two force sensors 4.

The design variant shown in FIGS. 3A and 3B illustrate a load cell as described herein, installed in a overhead rail scale. Guide section 1 consists in this instance of a pressed, square-sectioned tube.

Frame 6 and load-bearing element 7 are additionally stiffened respectively by a welded-on elbow fitting 11. The flexural joints were milled out. The feet 2 and mounting element 3 consist of angle irons welded onto elbow fittings 11. Mounting element 3 supports the load cell and thus, via feet 2, a rail section 12 of the overhead rail, upon which a load is weighed. The force sensor is again located at half the length of guide section 1, as basically applies for all of the design variants described herein.

Where force sensor 4 in the design variants shown in FIGS. 1 and 2 responds to tensile force, in this instance pressure force acts upon the force sensor. The diagonal installation of force sensor 4 represents one design option, and is favorable in the case of force sensor 4, in that relatively high inherent flexibility is provided, but in no way forced, as is shown in the subsequent design variants. Use in overhead rail scales is, of course, in no way limited to these design variants of the load cell described herein.

The section of the design variant shown in FIG. 4 is known from European Patent Application 88 902 114.0. In that design, however, only a short section is used for a single-point load cell in a size limited to use in a platform scale. In the case of the design variant shown here in FIG. 4, and in all subsequent design variants described herein, where, in each instance, only one section cross-section is shown, the design concept of guide section 1, shown in FIG. 1, is always involved. In this instance guide section I consists of a triangular frame 6, a triangular load-bearing element 7, and two plates 8, which are connected to frame 6 or load-bearing element 7 via flexural joints 9. Both triangular components—frame 6 and load-bearing element 7—are so arranged that respective force levels are introduced at the shortest side of the triangle. Force sensor 4 is installed diagonally in the rectangular cavity 15 located between plate 8 and the vertical lateral sides of the cited triangles of frame 6 and load-bearing element 7. The diagonal extends from the top end of frame 6 to the bottom end of load-bearing element 7. The connections to foot 2 and platform 5 are typically made via schematically indicated bolts.

In the design variant shown in FIG. 5, the triangles of frame 6 and load-bearing element 7 are so formed that their vertical sides come to externally lie against guide section 1. Two tongues 14 extend from both frame 6, as well as from load-bearing element 7, into a, in this instance, parallelogram-shaped cavity 15. Compared to the flexural hardness of flexural joints 9, these tongues 14 are designed to be plaint, so as to create reduced elasticity between flexural joints 9 and tongues 14. The reduction ratio, as always, includes the inherent elasticity of force sensor 4, which, in this instance, is designed to be elastically hard.

FIG. 6 shows a design variant of the load cell described herein in which the sections designated as frame 6 and load-bearing element 7 are designed as upright rectangles. Again, force sensor 4 is diagonally installed in cavity 15 and extends from the bottom end of frame 6 to the top of load-bearing element 7. As in the design variant shown in FIG. 5, force sensor 4 is impacted by pressure force via the loading of platform 5. The section of the design variants shown in FIGS. 4, 5, and 6, are preferably achieved through extrusion. Reworking through metal-cutting is then limited to corrections to flexural joints 9 and notching of tongues 14.

Figure 7B:
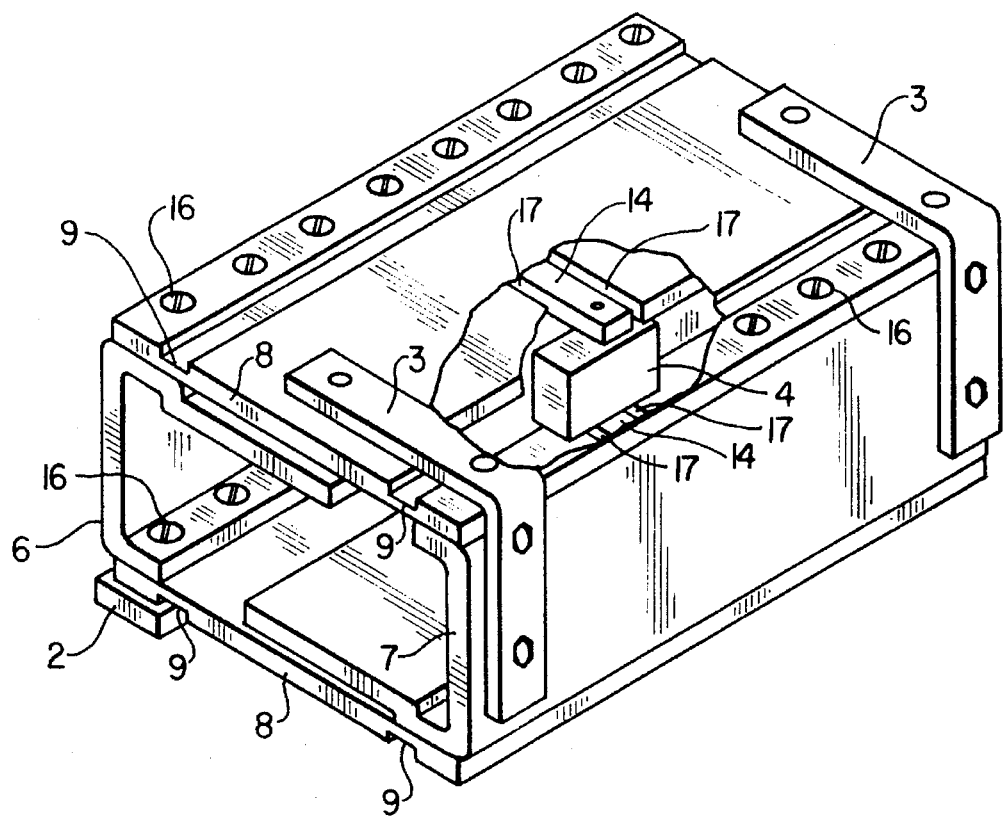

Unlike the design variants described so far, the guide section 1 shown in FIGS. 7A and 7B are bolted together from numerous sections. Frame 6 and load-bearing element 7 consist of typically identical, asymmetrical channels. One side of one of the plates 8 is attached via numerous bolts 16 to the shorter side of each channel, with the longer side being offset. The other side of one of the plates 8 is also attached via numerous bolts 16 in front of the offset, with the offset portion providing the section for each tongue 14 located in the center portion of guide section 1 via two respectively made notches within the widths of the tongues, as shown in FIG. 7. Again, two elbowed mounting elements 3 are externally attached to the load-bearing element, to which a platform 5 can be attached. In this instance, force sensor 4 is tensile force-loaded.

In the design variant shown in FIG. 8, frame 6 and load-bearing element 7 are each identically and angularly designed. Each has a single plate 18, instead of plates 8 with flexural joints 9. Although the interface area where the plate is connected to frame 6 or load-bearing element 7 via bolts 16, is designed to be strong, there is slight, but constant strength across the overall remainder of its width. The top plate 18 is bolted at the vertical side of the angular section forming frame 6 and at the inner side of the angular section forming load-bearing element 7, in the area of the corners of the plates. The same applies with respect to the bottom plate 18 (with the switching of frame 6 and load-bearing element 7). Loading of platform 5 results in the 5-shaped bending of plate 18. Force sensor 4 is directly connected to the horizontal sides of frame 6 and load-bearing element 7. Connection occurs via two pins guided through plates 18 through respective borings 20.

FIG. 9 shows another design variant installed in a conveyor belt scale, which is only shown schematically. Two feet 2 and two mounting elements 3 (in this instance, designed as heavy supports) are so arranged that each mounting element 3 is coaxial to each foot 2. Guide section 1, as described herein, consists of two triangular sections. Both frame 6, as well as load-bearing element 7, each support a rod 21 or 22, extending across the overall length of guide section 1, with the arrangement being such that rods 21 and 22 run horizontally and in parallel to one another and over one another, as shown in FIG. 9. The feet 2 support rod 21, while rod 22 supports mounting elements 3. Rods 21 and 22 are notched laterally to the longitudinal axis of guide section 1 in the center of guide section 1, which creates tongues 23, similar to tongues 14 shown in FIG. 7. Guide section 1 of the design variant shown in FIG. 9, is also typically produced by extrusion, including the incorporation of flexural joint 9. This does not, however, exclude possible reworking through metal-cutting. Both feet 2, as well as mounting elements 3, are guided through plates 8 via borings 24, similar to that of the borings 20, shown in FIG. 8.

In the design variant shown in FIG. 10, guide section 1 is typically produced from a pressed, square-sectioned tube, with plates 8 forming the horizontal, and frame 6 and load-bearing element 7 forming the vertical sides of the cited square-sectioned tube. Flexural joints 9 can be applied in the course of the same production sequence and, where necessary, be reworked via metal-cutting, or, produced entirely through metal-cutting. Both feet 2 (only one foot is visible in FIG. 10), as well as mounting elements 3, are attached to units 25 and channeled out of guide section 1 via borings 26. Units 25 are bolted to the side walls of guide section 1, only touch guide section 1 at these points, and extend laterally to the longitudinal axis of guide section 1 into the interior of guide section 1. Force sensor 4 passes diagonally through guide section 1 within the center plane, and is typically attached to guide section 1 via pins 19. When platform 5 (not shown), which lies on mounting elements 3, is loaded, the cited diagonal of guide section 1 is extended and force sensor 4 is thus loaded by tensile force. In a variant of FIG. 10 (not shown) the force sensor is installed in the other diagonal, and is thus impacted by pressure force.

I claim:

1. A load cell comprising:

a guide section (1) including a frame (6), a load-bearing element (7), two substantially parallel plates (8) each having a first end and a second end, and a plurality of band-shaped flexural joints (9), wherein the first end of each one of the two substantially parallel plates (8) is connected to the frame (6) by one of the plurality of band-shaped flexural joints (9) and the second end of each one of the two substantially parallel plates (8) is connected to the load-bearing element (7) by one of the plurality of band-shaped flexural joints (9), and wherein each of the band-shaped flexural joints (9) extend across the overall length of the guide section (1);

two feet (2), each attached to one end of the frame (6) of said guide section (3);

two mounting elements (3), each attached to one end of the load-bearing element (7) of said guide section (1);

a force sensor (4) installed between the frame (6) and the load-bearing element (7) at the center of the guide section (1);

wherein the flexural strength of the frame (6), the load-bearing element (7), and the substantially parallel plates (8), are greater than the flexural strength of the band-shaped flexural points (9);

wherein a longitudinal extension of said guide section (1) is greater than a lateral dimension of said guide section (1);

wherein the frame (6) and the load-bearing element (7) are more rigid than the two substantially parallel plates (8);

wherein each one of said two mounting elements (3) include an elbow fitting (11) having two ends and being attached at each end to the load-bearing element (7) at the same longitudinal position as a corresponding one of the two feet (2); and wherein said force sensor (4) is installed in a diagonal position at half the length of said guide section (1), with the force sensor extending from the frame (6) to the load-bearing element (7).

2. A load cell comprising:

a guide section (1) including a frame (6), a load-bearing element (7), two substantially parallel plates (8) each having a first end and a second end, and a plurality of band-shaped flexural joints (9), wherein the first end of each one of the two substantially parallel plates (8) is connected to the frame (6) by one of the plurality of band-shaped flexural joints (9) and the second end of each one of the two substantially parallel plates (8) is connected to the load-bearing element (7) by one of the plurality of band-shaped flexural joints (9), and wherein each of the band-shaped flexural joints (9) extend across the overall length of the guide section (1);

two feet (2), each attached to one end of the frame (6) of said guide section (1);

two mounting elements (3), each attached to one end of the load-bearing element (7) of said guide section;

a force sensor (4) installed between the frame (6) and the load-bearing element (7) at the center of the guide section (1);

wherein the flexural strength of the frame (6), the load-bearing element (7), and the substantially parallel plates (8), are greater than the flexural strength of the band-shaped flexural joints (9);

wherein a longitudinal extension of said guide section (1) is greater than a lateral dimension of said guide section (1);

wherein the frame (6) and the load-bearing element of said guide section (1) are each additionally reinforced by one of two elbow fittings (11);

wherein each one of said two feet (2) include a foot angular piece mounted onto a foot elbow fitting (11);

wherein each one of said mounting elements include a mounting element angular piece mounted onto a mounting element elbow fitting; and wherein said force sensor (4) is installed in a diagonal position at half the length of said guide section (1), with the force sensor extending from the frame (6) to the load-bearing element (7).

3. A load cell comprising:

a guide section (1) including a frame (6), a load-bearing element (7), two substantially parallel plates (8) each having a first end and a second end, and a plurality of band-shaped flexural joints (9), wherein the first end of each one of the two substantially parallel plates (8) is connected to the frame (6) by one of the plurality of band-shaped flexural joints (9) and the second end of each one of the two substantially parallel plates (8) is connected to the load-bearing element (7) by one of the plurality of band-shaped flexural joints (9), and wherein each of the band-shaped flexural points (9) extend across the overall length of the guide section (1);

two feet (2), each attached to one end of the frame (6) of said guide section (1);

two mounting elements (3), each attached to one end of the load-bearing element (7) of said guide section;

a force sensor (4) installed between the frame (6) and the load-bearing element 17) at the center of the guide section (1);

wherein the flexural strength of the frame (6), the load-bearing element (7), and the substantially parallel plates (8), are greater than the flexural strength of the band-shaped flexural joints (9);

wherein a longitudinal extension of said guide section (1) is greater than a lateral dimension of said guide section (1);

wherein frame (6) of said guide (1) comprises a cross section having a triangular shape expanding downwardly to a small side and the load-bearing element (7) of said guide (1) comprises a cross section having a triangular shape expanding upwardly to a small side; and wherein said feet (2) are attached to the small side of the triangular cross section of the frame (6) and the mounting elements (3) are attached to the small side of the triangular cross section of the load-bearing element (7).

4. The load cell as described in claim 3, wherein said force sensor (4) is installed in a diagonal position at half the length of guide section (1), with the force sensor extending from frame (6) to load-bearing element (7).

5. The load cell as described in claim 3, wherein the frame (6) and the load-bearing element (7) of said guide (1) each support a tongue at half the length of said guide section (1), and wherein said force sensor (4) is installed in a vertical position between the tongue supported by the frame (6) and the tongue supported by the load-bearing element (7).

6. A load cell comprising:

a guide section (1) including a frame (6), a load-bearing element (7), two substantially parallel plates (8) each having a first end and a second end, and a plurality of band-shaped flexural joints (9), wherein the first end of each one of the two substantially parallel plates (8) is connected to the frame (6) by one of the plurality of band-shaped flexural joints (9) and the second end of each one of the two substantially parallel plates (8) is connected to the load-bearing element (7) by one of the plurality of band-shaped flexural joints (9), and wherein each of the band-shaped flexural joints (9) extend across the overall length of the guide section (1);

two feet (2), each attached to one end of the frame (6) of said guide section;

two mounting elements (3), each attached to one end of the load-bearing element (7) of said guide section (1);

a force sensor (4) installed between the frame (6) and the load-bearing element (7) at the center of the guide section (1);

wherein the flexural strength of the frame (6), the load-bearing element (7), and the substantially parallel plates (8), are greater than the flexural strength of the band-shaped flexural joints (9);

wherein a longitudinal extension of said guide section (1) is greater than a lateral dimension of said guide section (1);

wherein the frame (6) of said guide section (1) comprises a cross section having an open upright rectangular shape and the load-bearing element (7) of said guide section (1) comprises a cross section having an open upright rectangular shape; and wherein said force sensor (4) is located at half the length of guide section (1) and extends diagonally from frame (6) to load-bearing element (7).

7. A load cell comprising:

a guide section (1) including a frame (6), a load-bearing element (7), two substantially parallel plates (8) each having a first end and a second end, and a plurality of band-shaped flexural joints (9), wherein the first end of each one of the two substantially parallel plates (8) is connected to the frame (6) by one of the plurality of band-shaped flexural joints (9) and the second end of each one of the at two substantially parallel plates (8) is connected to the load-bearing element (7) by one of the plurality of band-shaped flexural joints (9), and wherein each of the band-shaped flexural joints (9) extend across the overall length of the guide section (1);

two feet (2), each attached to one end of the frame (6) of said guide section;

two mounting elements (3), each attached to one end of the load-bearing element (7) of said guide section (1);

a force sensor (4) installed between the frame (6) and the load-bearing element (7) at the center of the guide section (1);

wherein the flexural strength of the frame (6), the load-bearing element (7), and the substantially parallel plates (8), are greater than the flexural strength of the band-shaped flexural joints (9);

wherein a longitudinal extension of said guide section (1) is greater than a lateral dimension of said guide section (1);

wherein the frame (6) and the load-bearing element (7) have identical asymmetrical channels with a short side and a long side, the long side having an elbow and an elbowed side;

wherein the first side of a first one of the two substantially parallel plates (8) is attached to the short side of the asymmetrical channel of the frame (6), and the first side of a second one of the two substantially parallel plates (8) is attached to the elbow of the asymmetrical channel of the frame (6);

wherein the second side of the first one of the two substantially parallel plates (8) is attached to the short side of the asymmetrical channel of the load-bearing element (7), and the second side of the second one of the two substantially parallel plates (8) is attached to the elbow of the asymmetrical channel of the frame (6);

wherein two recesses (17) are provided on each of the elbowed sides creating two tongues (14) at half the length of guide section (1), said force sensor (4) being installed in vertical position between the two tongues (14).

8. A load cell comprising:

a guide section (1) including a frame (6), a load-bearing element (7), two flexuralelastic plates (18) each having a first solid edge and a second solid edge, wherein the first solid edge of each one of the two flexuralelastic plates (18) is attached to the frame (6) and the second solid edge of each one of the at two flexuralelastic plates (18) is attached to the load-bearing element (7);

two feet (2), each attached to one end of the frame (6) of said guide section;

two mounting elements (3), each attached to one end of the load-bearing element (7) of said guide section (1);

a force sensor (4) installed between the frame (6) and the load-bearing element (7) at the center of the guide section (1);

wherein a lonqitudinal extension of said guide section (1) is greater than a lateral dimension of said guide section (1);

wherein the frame (6) and the load-bearing element (7) each have a solid angular section with a vertical side and a horizontal side;

wherein the first solid edge of a first one of the two flexuralelastic plates (18) is attached to the vertical side of the frame (6) and the first solid edge of a second one of the two flexuralelastic plates (18) is attached to an inside surface of the horizontal side of the load-bearing element (7) at approximately the intersection of the horizontal side and the vertical side of the load-bearing element (7);

wherein the second solid edge of a first one of the two flexuralelastic plates (18) is attached to the vertical side of the load-bearing unit (7) and the second solid edge of a second one of the two flexuralelastic plates (18) is attached to an inside surface of the horizontal side of the frame (6) at approximately the intersection of the horizontal side and the vertical side of the frame (6);

wherein each of the flexuralelastic plates (18) are provided with a boring (20) in the center of the flexuralelastic plates (18), and wherein said force sensor (4) is connected to the horizontal side of the frame (6) by a first pin passing through the boring of the flexuralelastic plate (18) connected to the horizontal side of the frame (6) and is connected to the horizontal side of the load-bearing element (7) by a pin passing through the boring of the flexuralelastic plate (18) attached to the horizontal side of the load-bearing element (7).

9. A load cell comprising:

a guide section (1) including a frame (6), a load-bearing element (7), two substantially parallel plates (8) each having a first end and a second end, and a plurality of band-shaped flexural joints (9), wherein the first end of each one of the two substantially parallel plates (8) is connected to the frame (6) by one of the plurality of band-shaped flexural points (9) and the second end of each one of the two substantially parallel plates (8) is connected to the load-bearing element (7) by one of the plurality of band-shaped flexural joints (9), and wherein each of the band-shaped flexural joints (9) extend across the overall length of the guide section (1);

two feet (2), each attached to one end of the frame (6) of said guide section;

two mounting elements (3), each attached to one end of the load-bearing element (7) of said guide section (1);

a force sensor (4) installed between the frame (6) and the load-bearing element (7) at the center of the guide section (1);

wherein the flexural strength of the frame (6), the load-bearing element (7), and the substantially parallel plates (8), are greater than the flexural strength of the band-shaped flexural joints (9);

wherein a longitudinal extension of said guide section (1) is greater than a lateral dimension of said guide section (1);

wherein said guide further includes four units (25), two of the units (25) being attached to the frame (6) and two of the units (25) being attached to the load-bearing element (7), the units (25) extending laterally to a longitudinal axis of guide section (1) and into a interior of guide section (1);

wherein each of the two substantially parallel plates (8) have two borings (26);

wherein each one of the two feet (2) are attached to a different one of the two units (25) connected to frame (6), the feet extending downwards through the borings (26) in the substantially parallel plates (8);

wherein each one of the two mounting elements (3) are attached to a different one of the two units (25) connected to load-bearing element (7), the mounting elements extending upwards through the borings (26) in the substantially parallel plates (8); and wherein said force sensor (4) is diagonally installed at half the length of guide section (1), with the force sensor extending from frame (6) to load-bearing element (7).

10. The load cell, as described in claim 1, 2, 4, 6, or 9, wherein said force sensor (4) extends from a top edge of the frame (6) to a bottom edge of the load-bearing element (7).

11. The load cell, as described in claim 1, 2, 4, 6, or 9, wherein said force sensor (4) extends from a bottom edge of the frame (6) to a top edge of the load-bearing element (7).

* * * * *

UNITED STATES PATENT AND TRADEMARK OFFICE
CERTIFICATE OF CORRECTION

PATENT NO.   : 5,496,973
DATED        : March 5, 1996
INVENTOR(S)  : Wirth, Johannes It is certified that error appears in the above-indentified patent and that said Letters Patent is hereby corrected as shown below:

| | |
|---|---|
| Column 4, line 56 | Replace "points" With --joints-- |
| Column 5, line 57 | Replace "points" With --joints-- |
| Column 5, line 66 | Replace "17)" With --(7)-- |
| Column 7, line 62 | Replace "lonqitudinal" With --longitudinal-- |
| Column 8, line 33 | Replace "points" With --joints-- |

Signed and Sealed this

Eleventh Day of June, 1996

Attest:

BRUCE LEHMAN

Attesting Officer     Commissioner of Patents and Trademarks